May 22, 1928.  
A. PETERSEN  
1,670,900  
PROCESS AND APPARATUS FOR CONCENTRATING CAOUTCHOUC AND THE LIKE LATICES  
Filed Nov. 12, 1925
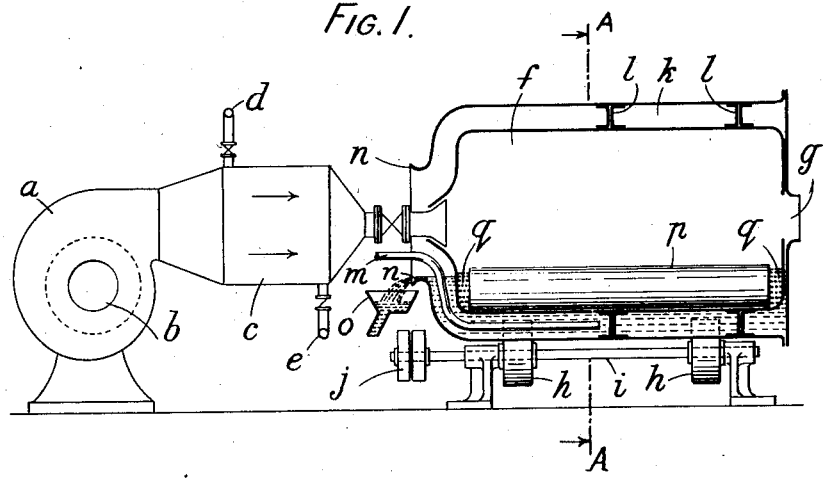
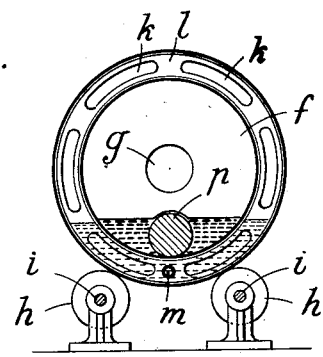
INVENTOR:  
ALFRED PETERSEN.

Patented May 22, 1928.

1,670,900

UNITED STATES PATENT OFFICE.

ALFRED PETERSEN, OF FRANKFORT-ON-THE-MAIN, GERMANY.

PROCESS AND APPARATUS FOR CONCENTRATING CAOUTCHOUC AND THE LIKE LATICES.

Application filed November 12, 1925, Serial No. 68,739, and in Germany November 14, 1924.

This invention relates to a process and apparatus for the concentration of rubber latex.

Many difficulties have hitherto been met in the concentration of rubber latex. If latex is evaporated in the ordinary way a skin is formed which impedes the evaporation of the water from the latex and results in loss of material. When agitating means such as stirrers are used for preventing the formation of a skin, coagulation may still occur on the arms of the stirrer, and also at any points where there is friction. When a high concentration has been reached, it is difficult to remove the product from the arms of the stirrer, and the increase of viscosity with concentration, results in losses owing to skin formation during the latter stages of the process.

When ammonia-preserved latex is being concentrated, considerable foaming usually occurs, the foam filling up the space above the liquid which again delays evaporation and further losses may be caused by the foam carried away by the evaporated water entering the exhaust conduits.

Various methods have been used to overcome the aforementioned difficulties. For example a drying gas has been blown through the latex, and currents of air have been used to prevent the formation of foam. However these methods required complicated plant and constant attention and did not lead to the desired result. In fine, none of the known methods enabled latex to be concentrated to a thick, paste-like consistency without any loss through coagulation or other causes.

It has now been found that a rapid concentration of latex may be accomplished without the formation of any foam or coagulation if the latex is subjected to evaporation in thin layers, and if for this purpose moving or rotating surfaces or bodies are employed which are covered with the latex for example by dipping thereinto.

During the time the thin layer of latex is carried along or round by the moving or rotating surface or body it is exposed to the action of a water removing drying medium, and on further moving or rotating the surface or body, the layer of latex from which the water has been partially removed is caused to dip again into the bulk of the latex. Thus a continued remixing of the layer from which the water has been partially removed with the bulk of the latex is effected which allows a uniform and rapid concentration of the latex to be attained without the water being removed at any one point to such an extent that the surface of the liquid would be covered with a skin.

The present invention thus provides a process for concentrating caoutchouc latex (including preserved or vulcanized latex, or latex stabilized by the addition of protective colloids), or latex of guttapercha, balata and other analogous vegetable resins, which consists in spreading out a thin layer of latex on a moving or rotating surface or surfaces withdrawing moisture from said thin layer, immersing the thus treated thin layer into the bulk of the latex to be concentrated and repeating the operation until said bulk reaches the desired concentration.

The invention can be carried out into practice in a large number of ways.

In the preferred form of carrying out the invention, the moving or rotating surface or body takes the form of a hollow drum rotatable around its longitudinal axis which drum is adapted to contain the latex and which can be heated from the outside, for example by providing a hot water, steam or the like jacket whilst a drying medium passes through said drum.

During the rotation of said drum a thin layer of latex is carried round on its inner surface, the moisture from which is partially removed by the drying medium, for instance hot air passing through the drum. The layer of latex from which the water has been partially removed returns to the bulk of the latex at the bottom of the drum, and the new layer which is always being formed continually exposes a fresh surface of latex to the action of the drying medium.

The high viscosity of concentrated latex tends to prevent uniform concentration, and the exposed surface of the thin layer of latex is consequently more concentrated than the inner part of the layer. It is therefore very important to remove the layer completely from the rotating surface and to mix it well with the bulk of the latex. This can be effected by using a spreading arrangement which is preferably also adapted to prevent too thick a layer of latex being carried up by the rotating surface or body when the concentrated latex has become very viscous.

The most convenient form of spreader is a cylinder or roller adapted to rotate freely. This roller may be fixed so as to provide a suitable distance between it and the rotating surface or body. Alternatively the roller may be free, and bear by its own weight against the rotating surface, in which case the distance between the roller and the rotating surface will be automatically controlled by the viscosity of the latex.

The spreader may be used in various ways according to the type of rotating surface or body employed, but when a drum is employed adapted to hold latex inside, a roller is employed which rests freely under its own weight on the lowest part of the rotatable drum. The depth of latex and the weight of the roller are adjusted so that the roller does not float but lies on the lowest part of the drum, and is compelled to roll round its longitudinal axis whilst it always comes into contact with a new part of the inner side of the rotating drum.

The efficiency of the roller in maintaining an even layer of latex and in mixing the concentrated layer with the main body of the latex is astonishing and most unexpected, since concentrated latex is most sensitive to pressure. The use of a cylindrical roller as spreader is of special value when it is desired to concentrate latex, to a high degree without the addition of protective colloids or down to a thick paste-like condition without any coagulation when protective colloids are added, in such a way that the concentrate remains water-soluble and can be retransformed into the original latex by the addition of water.

It is principally when the latex has become thick, that the very efficient action of the roller in forming a uniform thin layer on the inner surface of the drum becomes most apparent.

If desired the roller may be heated internally by any suitable means.

In order to understand the invention more clearly reference is made to the accompanying drawings which show by way of example one way of carrying out the invention into practical effect. However we wish it to be understood that this apparatus is given merely by way of example and that modifications of the construction of the apparatus may be made without departing from the scope of the invention.

Figure 1 of said drawings shows a sectional elevation through the apparatus.

Figure 2 is a cross-section through the drum.

Referring to Figure 1 of the drawings, $a$ is a fan having an inlet opening for air at $b$. $c$ is an air heater preferably of the tubular kind, in which the air blown in by the fan $a$ is brought to the required temperature before entering the drum $f$, preferably by steam which enters at $d$ and leaves at $e$. The hot air leaves the drum $f$ through the outlet opening $g$. The drum $f$ is rounded off at the inner edges and is adapted to revolve round its peripheral surface by means of friction wheels $h$ two of which are preferably arranged at either side of the drum, as shown in Figure 2. These friction wheels $h$ are mounted on a shaft $i$ driven by suitable driving means $j$ such as pulleys, electric motor or the like. The drum $f$ is adapted to be heated. In the example shown, a jacket $k$ is concentrically arranged around the circumferential area of the drum $f$ and spaced away from the drum by means of stays $l$. $m$ is a water pipe bent round in accordance with the bend of the jacket $k$ in which it is centrally arranged and leading to about the centre of the jacket up to the stays $l$ so that the drum $f$ and jacket $k$ can revolve around the stationary pipe $m$. The pipe $m$ serves to conduct water into the jacket $k$, the excess water flowing over the edges $n$ thereof into a discharge trough $o$.

Within the drum $f$ lies a loose cylindrical roller $p$ adapted to rotate freely and to act as a spreader and as means for controlling the thickness of the layer of latex carried on the inner circumference of the drum $f$ when it is revolved. As previously stated, this roller may be adapted to be heated.

In the drawings the roller $p$ is shown as bearing by its own weight against the surface of the drum the distance between the roller and the rotating surface being determined by the viscosity of the latex and the weight of the roller.

However the distance between the roller and the surface of the drum may be adjusted by any suitable means.

In order to prevent any friction being produced between the ends of the roller $p$ and the walls of the drum $f$ the internal edges of the drum $f$ are rounded off, so that only a small point of contact is provided between the edges of the roller $p$ and the rounded off internal edges of the drum, free spaces $q$ being provided between the ends of the roller $p$ and the sides of the drum $f$, so that no friction exists which would immediately give rise to the rubber coagulating and the formation of lumps in the concentrated latex.

The operation of the process is as follows:—

The drum is filled with latex to be concentrated, through the opening $g$ until it reaches nearly to the top of the roller $p$ as shown in Figure 2. The drum is thereupon set in rotation by starting the driving means $j$. Hot water is led in through the pipe $m$. The fan $a$ is started and steam is thereupon passed through the pipe $d$ of the air heater $c$. During rotation of the drum, a thin layer of latex is carried round on the inner surface thereof. Hot air entering the drum withdraws moisture from said thin layer of latex, from the surfaces of the cylinder $p$ and of the latex bath at the bottom of the drum $f$.

The moisture laden air leaves the drum $f$ through the opening $g$.

The thin layer of latex which has been carried around on the inner surface of the drum $f$ and from which the water has been partially removed, is then returned to the bulk of the latex at the bottom of the drum $f$ and a new thin layer of latex is carried round on the inner surface of the drum so that a fresh surface of latex is always exposed to the action of the drying air, and is continuously and completely removed from the surface and admixed with the bulk of the latex by the rotating roller $p$.

During the process, the rate of evaporation may be controlled by altering the volume and the temperature of the drying air passing into the drum $f$ and the temperature of the water passing through the pipe $m$ into the water jacket $k$, whilst the speed of rotation may also be varied to assist in said control.

The concentration is continued until the required concentration or consistency of the product is obtained.

For example, when using latex that has been stabilized with a protective colloid it is possible to continue the evaporating operation until a thick paste has been obtained containing less than 20% of water, the entire product being obtained in a form which can be reconverted into the original latex by the addition of water and which is free from any coagulated matter whatever.

The drum is stopped, the concentrated latex removed from the outlet $g$ and the operation is continued as above described. If it is desired to work in a continuous manner the concentrated latex paste can be removed during the working of the process either by hand or by suitable mechanical means new latex is introduced into the drum through the inlet $g$.

Whilst I have described by way of example one way of carrying out the invention, I wish it to be understood that the invention is to be in no way restricted to any particular apparatus now I have established the principle that by using a moving or rotating surface to form thin layers of latex from which the water is partially removed and which layers are thereupon remixed with the bulk of the latex to be concentrated and by using a spreading arrangement such as a frictionless roller to control the thickness of the latex layer it is possible to concentrate latex without coagulation occurring.

It is for example possible to modify the apparatus in such way that a moving or rotating surface such as an endless band or revolving drum is caused to dip into a bath of latex so that a layer of latex will be formed on said moving or rotating surface. In such a construction, a spreading roller or rollers is or are arranged on said moving or rotating surface to revolve without friction thereon and the whole apparatus is surrounded by a casing which is provided with inlet or outlet means for the moisture-withdrawing medium.

Instead of passing the drying medium from the heater $c$ into the drum $f$ directly it may be caused to pass through a conduit extending axially within the drum $f$, said conduit being if desired provided with radially arranged discharge pipes for the drying medium.

It is also possible to employ the following embodiment:—A stationary drying chamber is used for containing the latex to be concentrated. Rotatable discs mounted on a common shaft extending axially in said drying chamber and adapted to be set in motion by a suitable gear and dip into the latex, inlet and outlet means for the drying medium to and from the drying chamber being provided. In operation the drying chamber is charged to about two fifths its capacity with latex and the discs are set in slow rotary movement, whereupon a thin layer of latex is carried round on the surface of the discs. The hot drying medium entering the drying chamber withdraws moisture from the thin layer of latex from the surface of the revolving discs and from the surface of the latex bath at the bottom of the drying chamber and the moisture-laden air leaves the drying chamber through the outlet means. The thin layer of latex which has been carried round on the surface of the revolving discs from which the water has been partially removed, is then returned to the bulk of the latex at the bottom of the drying chamber, and another layer of latex is taken up so that a fresh surface of latex is always exposed to the action of the drying medium and is continuously removed from the surface and admixed with the bulk of the latex until the desired concentration is attained.

In this embodiment of the invention the rotational velocity of the discs must not be too high in order that none of the liquid will be projected from the edges by the centrifugal force and become coagulated through the continuous action of the drying medium.

Moreover instead of rollers, other means may be provided for spreading and controlling the thickness of the layer of latex, on the moving or rotating surface. In case discs are used for concentrating the latex, two revolving rollers may be employed which may be so arranged that their axis around which they rotate are arranged radially to the revolving discs.

It should be borne in mind that during the evaporation by means of a heated drying medium it has, for the purpose of preventing a local and sudden superheating of the adhering thin layer of latex, proved especially advantageous that the air after entering into the evaporation chamber should not impinge at once over the thin layer but first against the concentrated bulk in the sump of the evaporating vessel.

In certain cases, particularly when a drum is used, means may be provided for heating the interior of the drum and moreover the distance between the roller and the rotating surface may be made capable of adjustment, by suitable means, for example the roller may be provided with means for controlling its weight by making it hollow and filling the hollow space with a liquid or a solid to obtain the desired weight.

It is also possible to carry out the process under atmospheric pressure or in vacuo and under any desired conditions of temperature provided they are within the limits permissible in connection with the use of latex, as regards coagulation.

I claim:—

1. The process for concentrating latex of vegetable resin such as caoutchouc latex which consists in spreading out a thin layer of latex on a moving surface, withdrawing moisture from said thin layer whilst it is spread out on said moving surface, under conditions precluding any coagulation of the latex and returning the thus treated thin latex layer spread out on said moving surface into the bulk of the latex to be concentrated, and mixing said thin layer therein and repeating said operation until said bulk reaches the desired concentration.

2. The process for concentrating latex of vegetable resin such as caoutchouc latex which consists in spreading out a thin layer of latex on a rotating surface, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

3. The process for concentrating vulcanized caoutchouc latex which consists in spreading out a thin layer of latex on a rotating surface, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

4. The process for concentrating latex of vegetable resin such as caoutchouc latex which consists in causing a moving surface to dip into the latex to be concentrated, thereby spreading out a thin layer of latex on said moving surface, withdrawing moisture from said thin layer whilst it is spread out on said moving surface, under conditions precluding any coagulation of the latex and returning the thus treated thin latex layer spread out on said moving surface into the bulk of the latex to be concentrated, and mixing said thin layer therein by causing said moving surface to dip again into the latex to be concentrated and repeating the operation until said bulk reaches the desired concentration.

5. The process for concentrating latex of vegetable resin such as caoutchouc latex which consists in causing a rotating surface to dip into the latex to be concentrated, thereby spreading out a thin layer of latex on said rotating surface, withdrawing moisture from said thin layer whilst it is spread out on said rotating surface, under conditions precluding any coagulation of the latex and returning the thus treated thin latex layer spread out on said rotating surface into the bulk of the latex to be concentrated and mixing said thin layer therein by causing said rotating surface to dip again into the latex to be concentrated and repeating the operation until said bulk reaches the desired concentration.

6. The process for concentrating latex of vegetable resin such as caoutchouc latex which consists in spreading out a thin layer of latex on a moving surface, withdrawing moisture from said thin layer whilst it is spread out on said moving surface by passing a drying medium, such as heated air, in contact with said layer under conditions precluding any coagulation of the latex and returning the thus treated thin latex layer spread out on said moving surface into the bulk of the latex to be concentrated and mixing said thin layer therein and repeating said operation until said bulk reaches the desired concentration.

7. The process for concentrating latex of vegetable resin such as caoutchouc latex which consists in spreading out a thin layer of latex on a rotating surface, withdrawing moisture from said thin layer whilst it is spread out on said rotating surface by passing a drying medium, such as heated air, in contact with said layer under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

8. The process for concentrating latex of vegetable resin such as caoutchouc latex which consists in spreading out a thin layer of latex on a heated rotating surface, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

9. The process for concentrating vulcanized caoutchouc latex which consists in spreading out a thin layer of latex on a heated rotating surface, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

10. The process for concentrating latex of vegetable resin such as caoutchouc latex which consists in spreading out a thin layer of latex on a heated rotating surface, withdrawing moisture from said thin layer whilst it is spread out on said rotating surface by passing a drying medium, such as heated air, in contact with said layer under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

11. The process for concentrating latex of vegetable resin such as caoutchouc latex which consists in causing a heated rotating surface to dip into the latex to be concentrated thereby spreading out a thin layer of latex on said heated rotating surface, withdrawing moisture from said thin layer whilst it is spread out on said rotating surface by passing a drying medium, such as heated air, in contact with said layer, under conditions precluding any coagulation of the latex and returning the thus treated thin latex layer spread out on said rotating surface into the bulk of the latex to be concentrated, and mixing said thin layer therein by causing said rotating surface to dip again into the latex to be concentrated and repeating the operation until said bulk reaches the desired concentration.

12. The process for concentrating latex of vegetable resin such as caoutchouc latex which consists in spreading out a thin layer of latex on a moving surface, controlling the thickness of said layer of latex by spreading means such as a roller adapted to revolve without friction, withdrawing moisture from said thin layer whilst it is spread out on said moving surface, under conditions precluding any coagulation of the latex and returning the thus treated thin latex layer spread out on said moving surface into the bulk of the latex to be concentrated, and mixing said thin layer therein and repeating said operation until said bulk reaches the desired concentration.

13. The process for concentrating latex of vegetable resin such as caoutchouc latex which consists in spreading out a thin layer of latex on a rotating surface, controlling the thickness of said layer of latex by spreading means such as a roller adapted to revolve without friction, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

14. The process for concentrating vulcanized caoutchouc latex which consists in spreading out a thin layer of latex on a rotating surface, controlling the thickness of said layer of latex by spreading means such as a roller adapted to revolve without friction, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

15. The process for concentrating latex of vegetable resin such as caoutchouc latex which consists in causing a moving surface to dip into the latex to be concentrated, thereby spreading out a thin layer of latex on said moving surface, controlling the thickness of said layer of latex by spreading means such as a roller adapted to revolve without friction, withdrawing moisture from said thin layer whilst it is spread out on said moving surface, under conditions precluding any coagulation of the latex and returning the thus treated thin latex layer spread out on said moving surface into the bulk of the latex to be concentrated and mixing said thin layer therein by causing said moving surface to dip again into the latex to be concentrated and repeating the operation until said bulk reaches the desired concentration.

16. The process for concentrating latex of vegetable resin such as caoutchouc latex which consists in causing a rotating surface to dip into the latex to be concentrated, thereby spreading out a thin layer of latex on said rotating surface, controlling the thickness of said layer of latex by spreading means such as a roller adapted to revolve without friction, withdrawing moisture from said thin layer whilst it is spread out on said rotating surface, under conditions precluding any coagulation of the latex and returning the thus treated thin latex layer spread out on said rotating surface into the bulk of the latex to be concentrated and mixing said thin layer therein by causing said moving surface to dip again into the latex to be concentrated and repeating the operation until said bulk reaches the desired concentration.

17. The process for concentrating latex of vegetable resin such as caoutchouc latex which consists in spreading out a thin layer of latex on a rotating surface, controlling the thickness of said layer of latex by spreading means such as a roller adapted to revolve without friction, withdrawing moisture from said thin layer whilst it is spread out on said rotating surface, by passing a drying medium, such as heated air, in contact with said layer, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

18. The process for concentrating latex of vegetable resin such as cauotchouc latex which consists in causing a rotating surface to dip into the latex to be concentrated, thereby spreading out a thin layer of latex on said rotating surface, controlling the thickness of said layer of latex by spreading means such as a roller adapted to revolve without friction, withdrawing moisture from said thin layer whilst it is spread out on said rotating surface, by passing a drying medium, such as heated air, in contact with said layer, under conditions precluding any coagulation of the latex and returning the thus treated thin latex layer spread out on said rotating surface into the bulk of the latex to be concentrated, and mixing said thin layer therein by causing said rotating surface to dip again into the latex to be concentrated and repeating the operation until said bulk reaches the desired concentration.

19. The process for concentrating latex of vegetable resin such as caoutchouc latex which consists in spreading out a thin layer of latex on a heated rotating surface, controlling the thickness of said layer of latex by spreading means such as a roller adapted to revolve without friction, withdrawing moisture from said thin layer whilst it is spread out on said rotating surface, under conditions precluding any coagulation of the latex and returning the thus treated thin latex layer spread out on said rotating surface into the bulk of the latex to be concentrated, and mixing said thin layer therein and repeating said operation until said bulk reaches the desired concentration.

20. The process for concentrating latex of vegetable resin such as caoutchouc latex which consists in causing a heated rotating surface to dip into the latex to be concentrated, thereby spreading out a thin layer of latex on said heated rotating surface, controlling the thickness of said layer of latex by spreading means such as a roller adapted to revolve without friction, withdrawing moisture from said thin layer whilst it is spread out on said heated rotating surface, under conditions precluding any coagulation of the latex and returning the thus treated thin latex layer spread out on said heated rotating surface into the bulk of the latex to be concentrated and mixing said thin layer therein by causing said heated rotating surface to dip again into the latex to be concentrated and repeating the operation until said bulk reaches the desired concentration.

21. The process for concentrating latex of vegetable resin such as caoutchouc latex which consists in spreading out a thin layer of latex on a heated rotating surface, controlling the thickness of said layer of latex by spreading means such as a roller adapted to revolve without friction, withdrawing moisture from said thin layer whilst it is spread out on said rotating surface, by passing a drying medium, such as heated air, in contact with said layer, under conditions precluding any coagulation of the latex and returning the thus treated thin latex layer spread out on said heated rotating surface into the bulk of the latex to be concentrated, and mixing said thin layer therein and repeating said operation until said bulk reaches the desired concentration.

22. The process for concentrating latex of vegetable resin such as caoutchouc latex which consists in causing a heated rotating surface to dip into the latex to be concentrated, thereby spreading out a thin layer of latex on said heated rotating surface, controlling the thickness of said layer of latex by spreading means such as a roller adapted to revolve without friction, withdrawing moisture from said thin layer whilst it is spread out on said heated rotating surface, by passing a drying medium, such as heated air, in contact with said layer, under conditions precluding any coagulation of the latex and returning the thus treated thin latex layer spread out on said heated rotating surface into the bulk of the latex to be concentrated, and mixing said thin layer therein by causing said moving surface to dip again into the latex to be concentrated and repeating the operation until said bulk reaches the desired concentration.

23. Apparatus for concentrating latex of vegetable resin such as caoutchouc latex, comprising a rotatably mounted heatable drum for containing the latex, inlet and outlet means for a moisture withdrawing medium, inlet and outlet means for the latex to be concentrated, and a frictionless spreading roller bearing by its own weight upon the internal surface of the drum.

24. Apparatus for concentrating latex of vegetable resin such as caoutchouc latex, comprising a rotatably mounted heatable drum for containing the latex, inlet and outlet means for a moisture withdrawing medium, inlet and outlet means for the latex to be concentrated, a frictionless hollow spreading roller adapted to be weighted internally and bearing by its own weight upon the internal surface of the drum.

25. Apparatus for concentrating latex of vegetable resin such as caoutchouc latex, comprising a rotatably mounted heatable drum for containing the latex, a frictionless spreading roller within said drum bearing by its own weight upon the internal surface of said drum, rounded off internal edges on said drum adapted to provide only a small point of contact with the edges of said frictionless spreading roller, inlet and outlet means for a moisture withdrawing medium and inlet and outlet means for the latex to be concentrated.

26. Apparatus for concentrating latex of vegetable resin such as caoutchouc latex, comprising a rotatably mounted heatable drum for containing the latex, a heating jacket surrounding said drum, supporting stays for said heating jacket arranged between one half of said drum and the outer wall of the jacket, a hot water inlet pipe leading to said jacket near said supporting stays, hot water outlet means formed by rounded off edges of said jacket, means for rotating said drum and jacket around said hot water inlet pipe, inlet and outlet means for moisture withdrawing medium, inlet and outlet means for the latex to be concentrated and a frictionless spreading roller bearing by its own weight upon the internal surface of the drum.

27. Apparatus for concentrating latex of vegetable resin such as caoutchouc latex, comprising a rotatably mounted drum for containing the latex, a frictionless spreading roller within said drum bearing by its own weight upon the internal surface of said drum, rounded off internal edges on said drum adapted to provide only a small point of contact with the edges of said frictionless spreading roller, said drum being adapted to be heated by means of a heating jacket surrounding and spaced away from said drum by supporting stays arranged between one half of said drum and the outer wall of the jacket, a hot water inlet pipe leading to said jacket near the supporting stays, the edges of the jacket being rounded off to provide hot water outlet means during the rotation of said drum and jacket around said hot water inlet pipe, inlet and outlet means for moisture withdrawing medium and inlet and outlet means for the latex to be concentrated.

In testimony whereof, I affix my signature.

ALFRED PETERSEN.